Feb. 22, 1955 E. BUHLER 2,702,506

PRINTER WITH 4 POINT ZONING CONTROL

Filed Sept. 30, 1950 10 Sheets-Sheet 1

INVENTOR
Eugen Buhler
BY Ralph C. Dustin
ATTORNEY

INVENTOR
Eugen Buhler
BY Ralph C. Dustin
ATTORNEY

PRINTER WITH 4 POINT ZONING CONTROL

Filed Sept. 30, 1950 10 Sheets-Sheet 3

INVENTOR
Eugen Buhler
BY Ralph C. Shotin
ATTORNEY

PRINTER WITH 4 POINT ZONING CONTROL

INVENTOR
*Eugen Buhler*

BY Ralph C. Dustin
ATTORNEY

Feb. 22, 1955 E. BUHLER 2,702,506

PRINTER WITH 4 POINT ZONING CONTROL

Filed Sept. 30, 1950 10 Sheets-Sheet 5

INVENTOR
Eugen Buhler
BY Ralph C. Dustin
ATTORNEY

Feb. 22, 1955 E. BUHLER 2,702,506

PRINTER WITH 4 POINT ZONING CONTROL

Filed Sept. 30, 1950 10 Sheets-Sheet 6

INVENTOR
*Eugen Buhler*

BY *Ralph C. Dustin*
ATTORNEY

INVENTOR
Eugen Buhler
BY Ralph C. Dustin
ATTORNEY

INVENTOR
Eugen Buhler
BY Ralph C. Dustin
ATTORNEY

INVENTOR
Eugen Buhler
BY Ralph C. Dustin
ATTORNEY

Feb. 22, 1955 E. BUHLER 2,702,506

PRINTER WITH 4 POINT ZONING CONTROL

Filed Sept. 30, 1950 10 Sheets-Sheet 10

INVENTOR
Eugen Buhler
BY Ralph C. Dustin
ATTORNEY 2,702,506

PRINTER WITH 4 POINT ZONING CONTROL

Eugen Buhler, Poughkeepsie, N. Y., assignor to International Business Machines Corporation, New York, N. Y., a corporation of New York Application September 30, 1950, Serial No. 187,711

6 Claims. (Cl. 101—93)

This invention relates to printing mechanisms and more particularly to improvements in rotary type printing mechanisms like that disclosed in Patent No. 2,424,076, which operate under the control of perforated records.

In the rotary printing mechanism disclosed in Patent No. 2,424,076, it is possible, under the control of a perforated record medium, to print thirty-nine different characters, utilizing the well-known zone-subzone code combination arrangement of three positions of zone coding and nine positions of subzone coding. It is sometimes desirable to print more than thirty-nine characters without increasing the designation positions and yet making use of the conventional zone-subzone code combinations. By giving to one of the conventional subzone positions either zone or subzone significance, as desired, it is possible to print up to forty-seven different characters without departing from the zone-subzone code arrangement and without increasing the total number of designation positions that are required.

It is accordingly a specific object of this invention to provide an improved rotary printing mechanism having an expanded printing capacity.

Another object is to provide an improved mechanism which is operable to print characters in response to the sensing of perforations at zone and subzone positions on cards.

Still another object is to provide an improved printing mechanism which operates to give zone significance to a perforation at a predetermined card index point if no perforations exist at other zone index points, and to give subzone significance to the perforation at the predetermined point if a perforation exists at another zone point.

It is a further object to provide a novel printing device which is able to analyze and interpret a code designation position with either a zone or subzone significance.

A further object is to provide an improved rotary printing device which is operable to select and print from any one of a plurality of type elements in response to the sensing of coded perforations.

Other objects of the invention will be pointed out in the following description and claims, and illustrated in the accompanying drawings, which disclose, by way of example, the principle of the invention and the best mode, which has been contemplated, of applying that principle.

Figure 1:
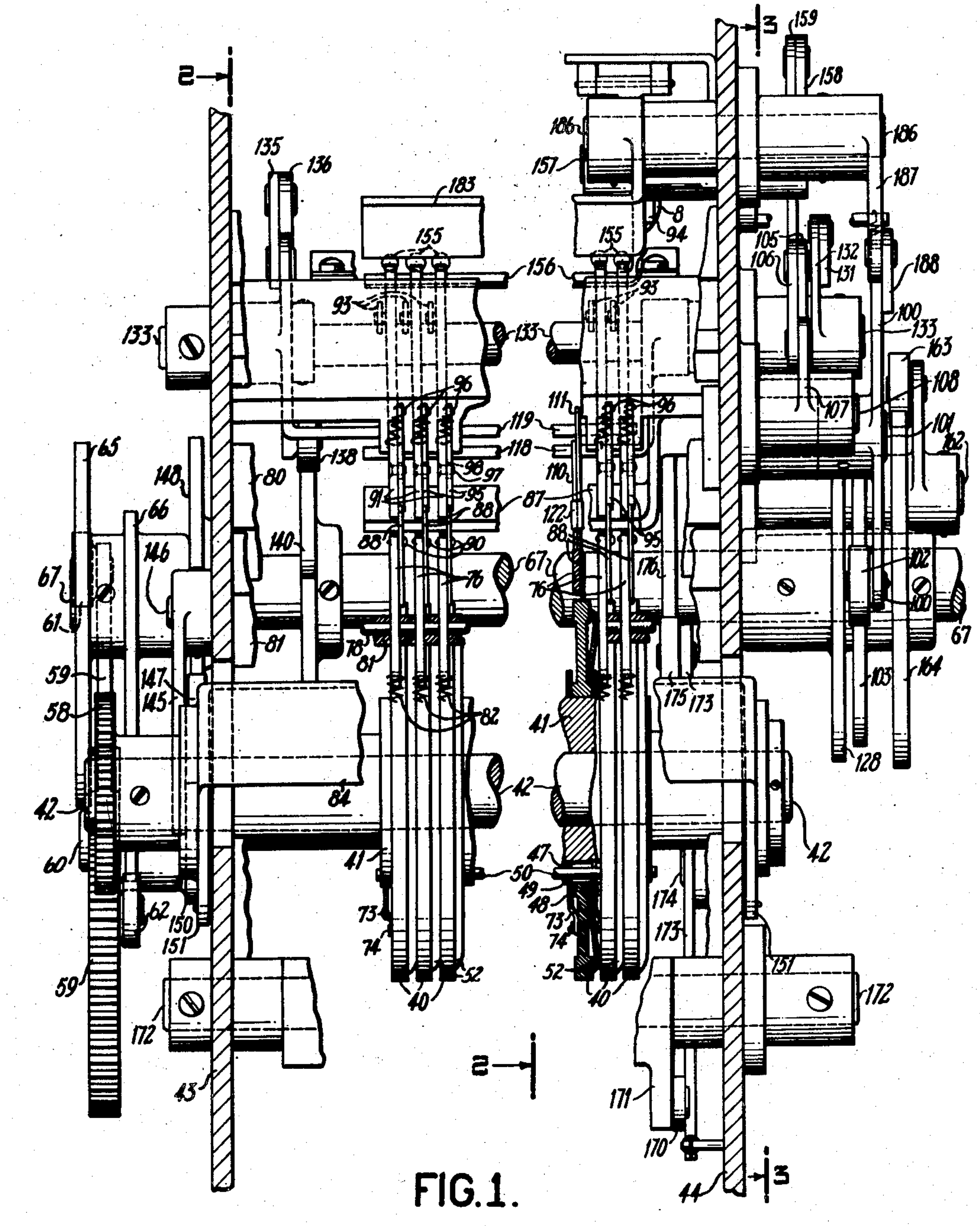
Fig. 1 is a vertical transverse section of one form of the improved printing mechanism with portions broken away.

There is shown in Figs. 1 to 5 an improved printing machine which is operable in response to the sensing of perforations in cards for printing numerical, alphabetical, and special characters. The perforations are formed at index points numbered 9 to 0, 11, and 12, as shown in Fig. 7, and the cards are fed one at a time, with the No. 9 points first, from a feed hopper 1 (see Fig. 6) by a picker 2. As the cards are fed from the hopper, they are picked up by feed rolls 3 and advanced between sensing brushes 4 and a contact roll 5 to a pair of feed rolls 6 which discharge them to a suitable stacking mechanism, not shown. One sensing brush is provided for each card column, and connected in a circuit with each brush is a magnet 8 which is energized upon the sensing of a perforation.

For driving the card picker and the feed rolls, there is provided a motor 10 which is energized, upon the closing of a switch 11, from a power source 12 through conductors 14 and 15. Attached to the power shaft of the motor is a gear 16 meshing with a gear 17 supported loosely upon a shaft 18. Fixed to the gear 17 is a clutch plate 19 having a notch 20 adapted to receive a dog 21 which is pivotally supported by an arm 22 attached to one end of the shaft 18. An armature latch 24 is engageable with the outer end of the arm 22 and a tail portion of the dog for holding the latter disengaged from the notch 20 and holding the shaft 18 against rotation. A clutch magnet CM is operable when energized to retract the armature latch against the action of a spring 25 for releasing the dog and the arm 22.

Attached to the shaft 18 is a bevel gear 26 meshing with a bevel gear 27 on a shaft 28. The picker 2 is operatively connected to the shaft 28 through bevel gears 29, and the feed rolls 3 and 6 are operatively connected to the shaft 28 through bevel gears 30 and 31, respectively. When the clutch magnet CM is energized, the armature latch is operated to disengage the arm 22 and the dog 21 for effecting a driving of the picker 2 and the feed rolls so as to advance the cards one at a time from the bottom of the card stack in the hopper to the sensing brushes 4. Upon the sensing of perforations in the cards by the brushes, the magnets 8 are energized for controlling the operation of the printing machine which will now be described.

*Printing mechanism*

Figure 2:
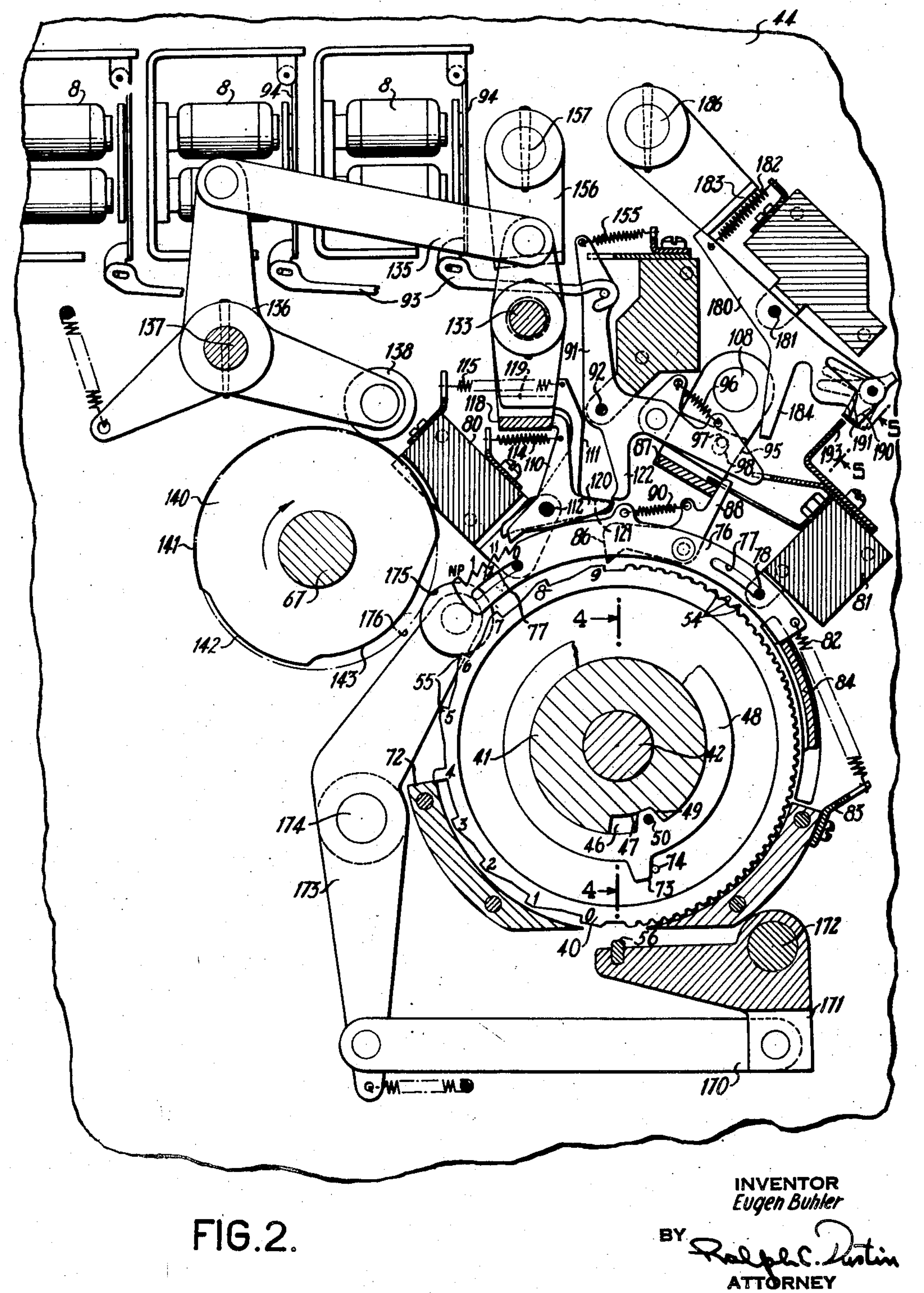
Fig. 2 is a vertical sectional view taken in the plane of the line 2—2 of Fig. 1.
Figure 4:
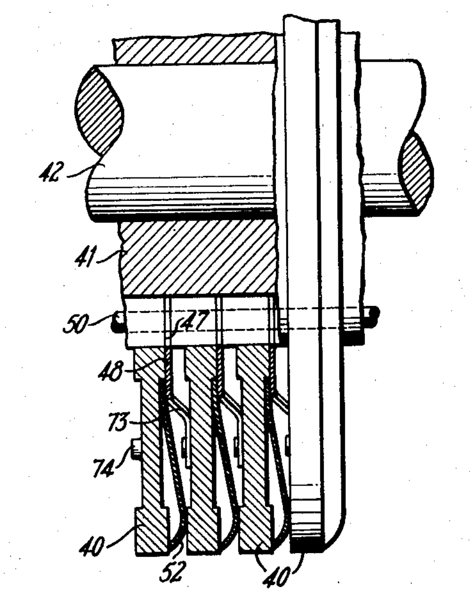
Fig. 4 is a view showing the detail structure of the supporting and driving means for the type wheels, this view being taken on the line 4—4 of Fig. 2.
Figure 5:
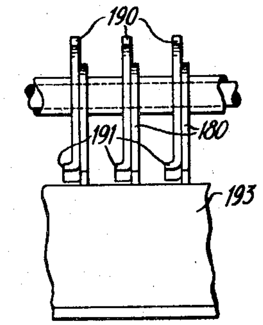
Fig. 5 is a view showing devices for controlling the printing of zeros.

The printing machine comprises, as shown in Figs. 1 and 2, a plurality of print wheels 40 loosely mounted upon a sleeve 41 which is fixed by any suitable means, not shown, to a shaft 42 journalled in side plates 43 and 44. Extending longitudinally through the outer periphery of the sleeve 41 is a groove 46, and formed at spaced intervals along the sleeve are arcuate grooves 47. An annular plate 48 is provided for each of the arcuate grooves 47, and each plate has an inwardly projecting tongue portion 49 which is movable in the longitudinal groove 46 until the disk is in line with one of the arcuate grooves. The plate is then rotated so that the tongue portion moves into the groove 47 for holding the plate against movement longitudinally of the sleeve. A wire 50 inserted through openings in the tongue portions and the sleeve 41 holds the plates for rotation with the sleeve. Each of the print wheels 40 is arranged between two of the plates as shown in Fig. 4, and a spring steel disk 52 is fixed to one of the plates and is held in frictional engagement with the print wheel so that the latter tends to rotate with the sleeve 41 and the shaft 42.

Formed upon each of the print wheels are type elements 54 and ratchet teeth 55 numbered from 0 to 9 as shown in Fig. 2. There is a type element for each of the characters shown in Fig. 7, and, as the wheel is rocked in a clockwise direction, the type elements pass a printing hammer 56 in the order in which the characters are arranged in Fig. 7 reading from left to right.

Once during each machine cycle, the shaft 42 is oscillated so that the print wheel may be rotated in a clockwise direction approximately one-half of a revolution and then returned again to their home positions as shown in Fig. 2. For oscillating the shaft 42, there is provided a gear 58, Fig. 3, fixed to the shaft 42 and meshing with a bell crank sector 59 mounted on a stud 60 carried by the side plate 44. A pair of rollers 61 and 62 are mounted upon the bell crank sector and cooperate with complementary cams 65 and 66 on a shaft 67 journalled in the side plates. The shaft 67 carries a gear 68, Fig. 6, meshing with a gear 70 on the shaft 18. Upon engagement of the dog 21 with the notch in the clutch plate 19, the shaft 18 is rotated and effects a driving of the shaft 67 at the same speed.

One of the ratchet teeth 55 extends outwardly beyond the others and is engageable with a stationary abutment 72 when the print wheel is in its home position. As the shaft 42 is rotated in a clockwise direction, the print wheels are caused to rotate with it by the frictional engagement of the spring plates 52. It will be appreciated that the print wheels may be stopped in any printing position while the shaft 42 continues rotating in a clockwise direction. To assure that each print wheel is returned to its home position, there is provided an outwardly projecting portion 73 on one of the adjacent plates 48 engageable with a lug 74 on the print wheel. If the print wheel fails to rotate with the shaft 42 in a counterclockwise direction, the projecting portion 73 engages the lug 74 and moves the wheel positively to its home position.

Arranged above each of the print wheels is an arcuate slide 76 having elongated slots 77 for receiving supporting pins 78 carried by comb-like extensions on members 80 and 81 extending transversely between the side plates 43 and 44. Each arcuate slide is urged in a clockwise direction about the periphery of its print wheel by a spring 82 connected between the right-hand end of the slide and a stationary abutment 83. A bail 84 engages the right-hand ends of the slides and holds the latter in the position shown in Fig. 2 until the rotation of the print wheels in a clockwise direction has been almost completed.

Pivotally mounted upon each slide is a stop pawl 86 which is adapted to engage any one of the ratchet teeth 55 for holding the print wheel against rotation with the shaft 42 in a clockwise direction. A bail 87 is engageable with upwardly projecting tail portions 88 on the stop pawls for holding the latter in their retracted positions against the action of springs 90. A control lever 91 is pivotally supported at 92 and is connected by a link 93 to the armature 94 of one of the magnets 8 referred to above in connection with Fig. 6. The magnet to which the control lever is connected is energized through a brush sensing a card column in a position corresponding to that of the print wheel to be controlled. Pivotally mounted upon the control lever is a latch 95 which is normally urged by a spring 96 to a position in which it is engaged by the upper portion of the tail 88 on the stop pawl. A pin 97 is fixed to the control lever and extends through an elongated opening 98 in the latch 95 for limiting its movement into the path of the tail portion 88.

Figure 3:
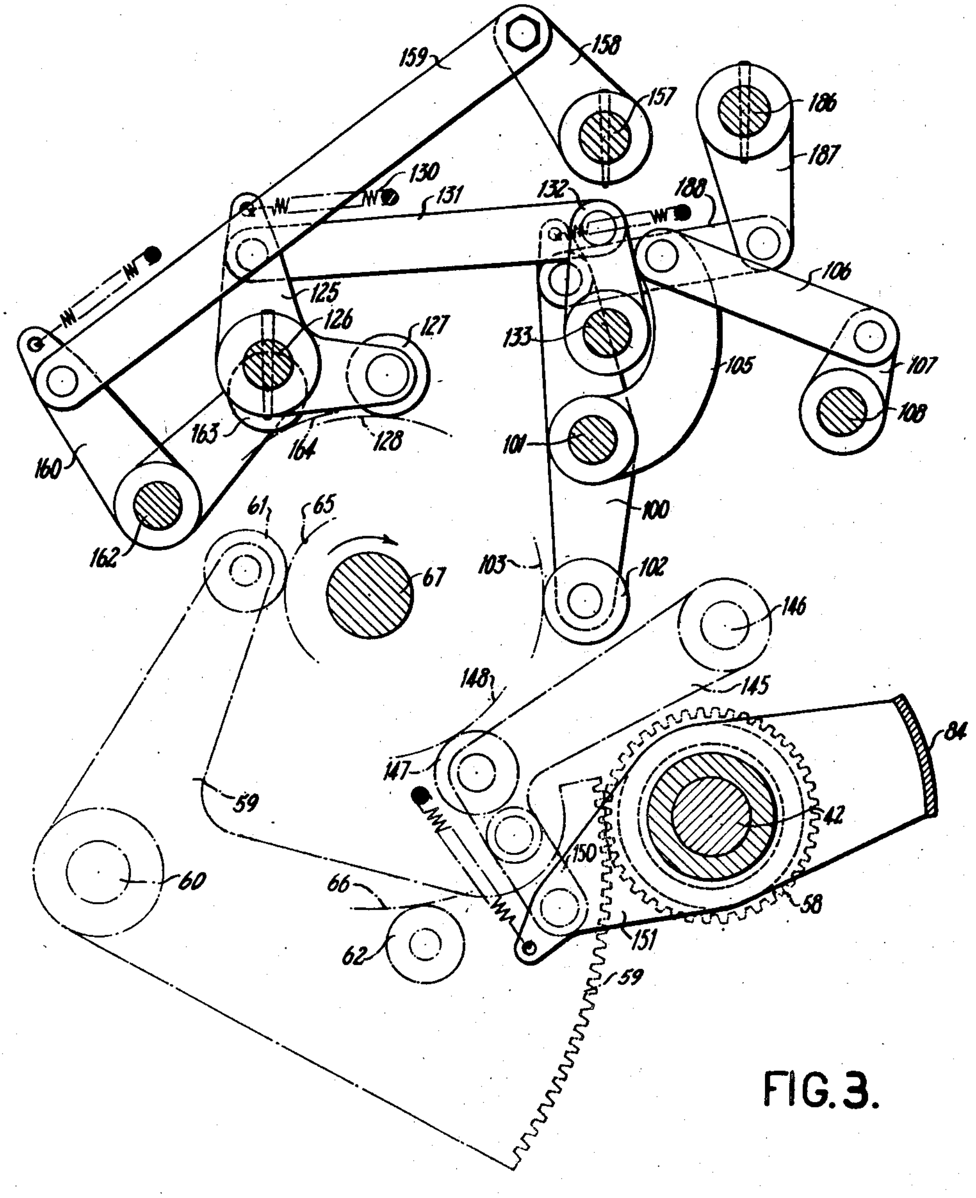
Fig. 3 is a vertical sectional view taken in the plane of the line 3—3 of Fig. 1.

The print wheels are rotated in a clockwise direction so that the ratchet teeth 55 come into position for engagement by the stop pawl 86 in synchronism with the sensing of corresponding numbered holes in the cards by the brushes 4. Just before the print wheels are rotated from their home positions, the bail 87 is rocked in a clockwise direction in Fig. 2 so that the pawls 86 are held retracted only by the latches 95. For rocking the bail 87, there is provided, as shown in Fig. 3, a lever 100 fixed to a shaft 101 and carrying a roller 102 which cooperates with a cam 103 on the shaft 67. An arm 105 is fixed to the shaft 101 and is connected by a link 106 to an arm 107 on a shaft 108 to which the bail 87 is attached.

As a perforation in the card is sensed by the brush 4 for the magnet 8 which controls the print wheel shown, the magnet is energized to rock the control lever 91 in a counterclockwise direction and effect movement of the latch 95 out of the path of the tail portion 88 on the stop pawl. The spring 90 then rocks the pawl into position for engaging the ratchet tooth 55 corresponding to the number of the index point at which the perforation was located.

Formed in the left-hand portion of each slide 76 are notches marked 0, 11, 12, 1, and NP (No Print), as shown in Fig. 2. Zoning pawls 110 and 111 are pivotally supported by a pin 112 in the plane of the arcuate slide 76. The pins 112 are carried by comb-like extensions of the supporting member 80, and springs 114 and 115 tend to rock the pawls 110, 111, respectively, in a counterclockwise direction. Bails 118 and 119 cooperate with the pawls 110, 111, respectively, and operate to hold the latter in the position shown in Fig. 2 during the first part of the rotation of the print wheels in a clockwise direction. Formed upon the pawls 110 and 111 are tail portions 120 and 121 which are engageable with a projecting arm 122 on the control lever 91 when the latter is in its normal position.

Figure 8:
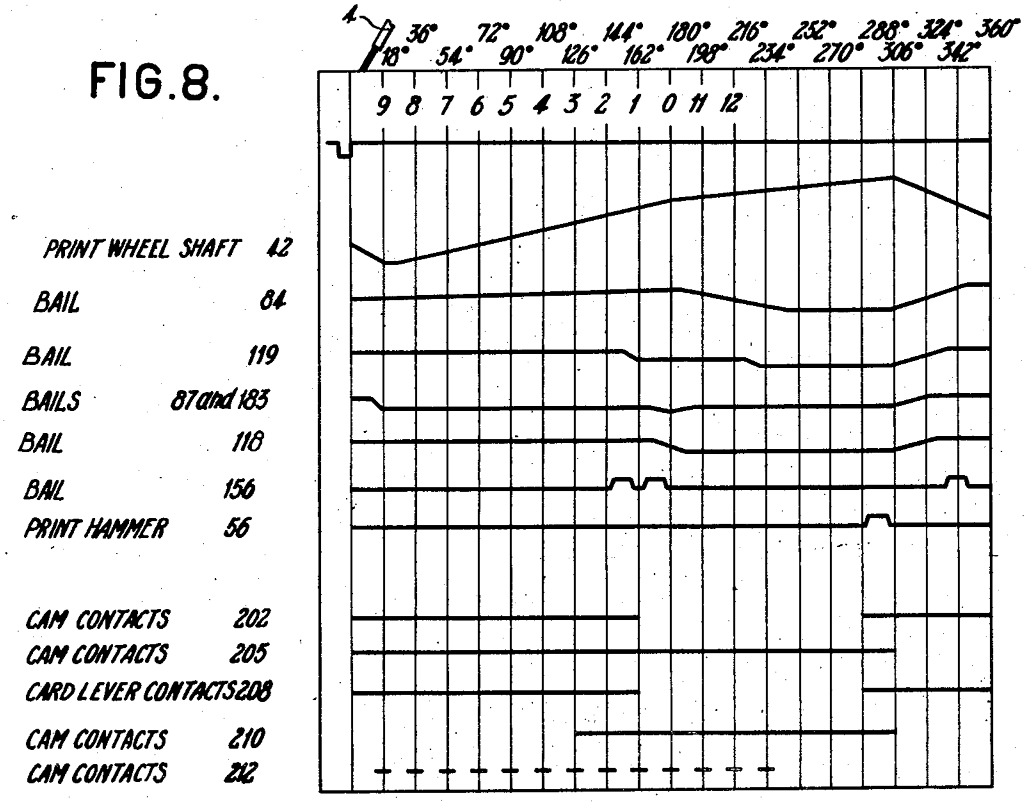
Fig. 8 is a timing diagram.

For rocking the bail 118 there is provided, as shown in Fig. 3, a bell crank 125 mounted upon a shaft 126 and carrying a roller 127 which cooperates with a cam 128 on the shaft 67. A spring 130 urges the bell crank in a direction to engage the roller with the cam 128, and a link 131 connects the bell crank to an arm 132 on a shaft 133 to which the bail 118 is attached. The cam 128 is shaped to rock the bail 118, as indicated by Fig. 8, from the position shown in Fig. 2 in a clockwise direction between the sensing of the 1 and 0 points on the card.

The bail 119 is rotatably supported by the shaft 133 and is connected, as shown in Fig. 2, by a link 135 to a bell crank 136 pivoted at 137 and carrying a roller 138 cooperating with a cam 140 on the shaft 67. This cam is provided with a high dwell 141 which operates to hold the bail 119 in the position shown in Fig. 2 while the card index points 9 to 2 are sensed. A medium dwell portion 142 on the cam comes under the roller 138 just before the No. 1 index point is sensed and permits the bail 119 to rock a short distance in a clockwise direction. It will be noted in Fig. 2 that the nose of the pawl 111 is held slightly above that of the pawl 110. When the bail 119 is rocked from its position in Fig. 2, the tail portion 121 of the pawl 111 engages the arm 122 on the control lever 91 and is held by the latter. If a perforation is sensed at the No. 1 point, the control lever is rocked so that it releases the pawl 111 and permits the latter to swing in a counterclockwise direction until it engages the bail again. The movement of the pawl is sufficient only to position its nose in the same plane as that of the pawl 110. It will be appreciated that the tail portion 121 is then above the end of the arm 122 so that further movement of the pawl is determined only by the bail 119.

The cam 140 is provided with a low dwell portion 143 which comes under the roller 138 just after the No. 12 index point on the card is sensed. If the pawl 111 has been released by the sensing of a perforation at the No. 1 index point, then this pawl swings with the bail 119 when the latter rocks due to the movement of the roller 138 to the low dwell portion 143. The nose of the pawl 111 then engages one of the notches in the left-hand portion of the slide 76.

As mentioned above, the bail 118 is rocked in a clockwise direction between the sensing of the 1 and 0 index points. The tail portion 120 on the pawl 110 then engages the lower end of the arm 122 for holding the pawl against movement in a counterclockwise direction. If a perforation is sensed at any one of the 0, 11, or 12 points, the control lever 91 is rocked to release the pawl 110 so that it engages one of the notches in the slide 76.

Just after the 0 point on the card has been sensed, the bail 84 starts to rock in a clockwise direction, and the slide 76 follows this bail. For actuating the bail 84 there is provided, as shown in Fig. 3, an arm 145 pivotally mounted at 146 and carrying a roller 147 cooperating with a cam 148 on the shaft 67. The free end of the arm is connected by a link 150 to an arm 151 formed integral with the bail which is rotatably supported by the shaft 42. Cam 148 is shaped to permit movement of the slide 76 so that the 0, 11, 12 notches come into position for engagement by the pawl 110 in synchronism with the sensing of perforations at the corresponding numbered index points.

The control lever 91 is normally held in its latching position by a spring 155. In order to assure that this lever is returned to its latching position after it is rocked by the magnet 8 there is provided a knockoff bail 156 connected to a shaft 157 and engageable with the upper end of the lever. Fixed to the shaft 157, as shown in Fig. 3, is an arm 158 connected by a link 159 to a bell crank 160 pivotally supported at 162 and having a roller 163 which is held in engagement with a cam 164 on the shaft 67. This cam is shaped to rock the bail 156, as indicated in Fig. 8, for returning the control lever to its latching position before the 9, 1, and 0 points on the card are sensed.

The operation of the mechanism described above is as follows: Assume that the clutch mechanism is disengaged and that the motor 10 operates to drive the card picker 2, the feed rolls 3, 6, and the cam shaft 67. By the end of the first machine cycle, the bottom card is advanced so that its index points are located with respect to the brushes 4 in positions indicated by Fig. 8. At the same time, the control mechanisms for the print wheels are in the positions shown by Fig. 2.

The bail 87 is now operated by the cam 103 to release the stop pawls so that the latter are held only by the latches 95. As the motor 10 continues to operate, the print wheels are rocked in a clockwise direction so that the ratchet teeth 55 come into positions for engagement by the stop pawl 86 in synchronism with the sensing of the corresponding index points on the card. If a perforation at any one of the 9 to 1 points is sensed, the control lever 91 is rocked by the magnet 8 and lifts the latch 95 to release the stop pawl for engaging the corresponding ratchet tooth. The shaft 42 continues rotating in a clockwise direction, and any print wheels not engaged by stop pawls are rotated the full distance with the shaft to no print positions.

Just before the No. 1 index point of the card is sensed, the knockoff bail 156 is actuated to assure a return of the control lever 91 to its latching position. It will be noted that the tail portion 88 of a released pawl lies beneath the latch 95, but this does not prevent a clockwise rotation of the control lever since the elongated opening 98 permits movement of the pin 97 downwardly therein. As soon as the control lever is knocked off by the bail 156, the bail 119 is moved to the left in Fig. 2 by the dropping of the roller 138 to the intermediate dwell portion 142 on the cam 140. The zoning pawl 111 is then held in the position shown in Fig. 2 only by its tail portion 121 engaging the lower end of the arm 122 on the control lever. If a perforation is sensed at the No. 1 index point, the control lever is rocked to release the zoning pawl 111 so that it moves until it engages the bail 119. The nose of the pawl 111 is then in the same plane as that of the pawl 110.

Between the sensing of the Nos. 1 and 0 index points, the control lever 91 is again rocked by the bail 156 to its latching position. Just before the 0 point is sensed, the bail 118 is moved to the left in Fig. 2 so that the pawl 110 is held only by engagement between its tail portion 120 and the arm 122 on the control lever. At approximately the same time that the 0 index point is sensed, the slide 76 is permitted to move to the right in Fig. 2 so that the 0. 11, and 12 notches at the left end of the slide come under the nose of the pawl 110 in synchronism with the sensing of the corresponding index points in the card. Since the stop pawl 86 is pivoted to the slide 76, it will also move with the latter and permit the print wheel to rotate in a clockwise direction. If a perforation is sensed at any one of the 0, 11, or 12 index points, the control lever 91 is rocked to release the pawl 110 so that it engages one of the notches and stops movement of the slide 76 as well as the print wheel.

Just after the No. 12 index point on the card has been sensed, the bail 119 is moved farther to the left so that the pawl 111 engages one of the notches in the slide. If the slide has not been previously stopped by the pawl 110, the pawl 111 will be released to engage the No. 1 notch in the slide. If neither of the pawls 110 or 111 are released by a rocking of the control lever, then the slide 76 continues its movement to the right until the outwardly projecting portion at the NP notch engages the zoning pawls and stops further movement of the slide.

It will be appreciated that a single perforation at one of the index points 9 to 2 will result in a stopping of the print wheel by the pawl 86 engaging the corresponding numbered ratchet tooth 55. If there is no other perforation in the card column, the slide 76 will later move to the right until the NP notch is engaged by the zoning pawls 110 and 111. The print wheel will then be in a position for printing the number represented by the perforation. A perforation at the No. 1 point alone or in combination with a perforation at one of the 9 to 2 points results first in a release of the stop pawl 86 to engage the ratchet tooth corresponding to the first index point sensed and then an operation of the pawl 111 to engage the No. 1 notch in the slide. If there is a perforation at one of the 0, 11, and 12 points in combination with a perforation at one of the 9 to 1 points, then the movement of the print wheel will be determined by the engagement of the stop pawl 86 with one of the ratchet teeth 55 and engagement of the zoning pawl 110 with one of the teeth 0, 11, and 12. Engagement of the pawl 110 with one of the 0, 11 and 12 notches prevents the pawl 111 from being effective when a perforation exists at the No. 1 point. In such a case, the pawl 111 engages the same notch as the pawl 110.

When there is no perforation, the print wheel continues rotating until the 0 ratchet tooth 55 is engaged by the stop pawl due to the movement of the slide 76 to the right at 0 time. It will be appreciated that even though the latch 95 is not raised by an actuation of the control lever, the stop pawl 86 is permitted to rotate in a counterclockwise direction when its pivot point moves to the right relative to the latch. A perforation at the 0 point alone results in an engagement of the stop pawl with the 0 ratchet tooth, but in this case the pawl 110 is also released to engage the 0 notch in the slide. At this time, the print wheel is in a position for printing zero. When there is no perforation, the pawls 110 and 111 are held in their raised positions and stop the slide 76 only when they are engaged at the NP notch. The print wheel continues rotating in a clockwise direction as long as the slide 76 is permitted to move in that direction. When the stop pawl 86 engages the 0 ratchet tooth and the pawls 110 and 111 engage the NP notch, the print wheel is in a no print position.

After the print wheels have been adjusted in accordance with the card perforations, the print hammer 56 is rocked in a clockwise direction in Fig. 2 to effect printing. A record sheet and an inked or carbon ribbon are fed by a suitable means, not shown, between the print wheels and the hammers 56 in Fig. 2. For effecting actuation of the print hammers there is provided a link 170 pivotally connected to an arm portion 171 of the hammer which is pivotally supported at 172. The other end of the link is connected to a bell crank 173 pivotally supported at 174 and carrying a roller 175 engageable with a cam 176 fixed to the shaft 67. As shown in Fig. 8, the shaft 42 is rocked by the cams 65 and 66 to its extreme position in a clockwise direction at approximately 270°. The shaft and the print wheels remain in their adjusted positions between 270° and 306°, and the cam 176 actuates the hammer 56 at approximately 295° to effect printing.

*Zero print control*

When the cards are punched to effect a printing of numbers alone, all of the card columns not needed in the printing of the number are sometimes punched at their 0 points. It is then necessary that means be provided for preventing the printing of zeros in response to the sensing of perforations at such points. The eliminating of zero printing by each wheel may be accomplished by a lever 180 (Fig. 2) pivotally supported at 181 and held by a spring 182 in engagement with a bail 183. Projecting from the lever 180 is a finger 184 adapted to move over the latch 95 when the lever is rocked in a clockwise direction. If the latch is raised by a rocking of the control lever 91 before the bail 183 is actuated to release the lever 180, then the latch 95 is held by the tail portion 88 of the stop pawl 86 in the path of the finger 184 and prevents a rocking of the lever 180.

The bail 183 is connected to a shaft 186 having an arm 187 (Fig. 3) which is connected by a link 188 to the lever 100 cooperating with the cam 103. As mentioned above, the cam 103 operates to rock the lever 100 for moving the bail 87 to the left in Fig. 2 before any rotation of the print wheels in a clockwise direction takes place. At the same time, the bail 183 is actuated to permit movement of the lever 180 to a position in which its arm 184 is closely adjacent to the latch 95. Just before the 0 point on the card is sensed, the cam 103 permits further movement of the bail 183 so that the lever 180 may move to a position in which its arm 184 overlies the latch 95 if the latter has not already been raised and prevents such movement.

Pivoted on each lever 180 is a control member 190 having a laterally projecting portion 191 (Fig. 5) which is engageable with the control lever 180 in the next adjacent lower order position. The member 190 is adjustable to either an inner limiting position in which it engages a fixed abutment 193 and has its portion 191 in the path of the next lever 180, to an intermediate position in which it is free of the abutment member but still has its projecting portion 191 in a position for engagement by the adjacent lever 180, or to an outer limiting position in which it is free of the abutment member and also has its projecting portion 191 removed from the path of the next adjacent lever.

If it is desired to eliminate the printing of zeros only to the left of the highest significant figure, the members 190 are moved to their intermediate positions. When the stop pawl 86 is released for positioning the print wheel in the highest order position, the latch 95 for that pawl is held in its raised position by the tail portion 88 of the pawl. The arm 184 on the lever corresponding to the print wheel is then held against movement to a position above the latch. The projecting portion 191 on the control member 190 holds the lever 180 in the next lower order position against movement in a clockwise direction. The same thing is true for all the other levers 180 in lower order positions. When the 0 index points are sensed, the control levers 91 in positions to the right of the highest significant figure are then free to be actuated for releasing the pawls 110 to stop the print wheels in 0 printing positions if perforations are sensed. The levers 180 controlling print wheels in positions to the left of that printing the highest significant figure are free for movement in a clockwise direction. Just before the sensing of a 0 point, the levers 180 for the higher order positions move so that their arms 184 lie above the latches 95 and prevent a rocking of the control levers 91 when perforations at the 0 points in these positions are sensed. This prevents a release of the zoning pawls 110 and 111 so that the print wheels continue rotating to their no print positions.

If it is desired that there be a printing of zeros in some of the higher order positions immediately adjacent that in which the highest significant figure is to be printed, the member 190 in the highest order position in which the printing of 0 is to take place is moved so that it overlies the abutment member 193 and is held by the latter to prevent a clockwise rotation of the lever 180 when its bail is actuated during the sensing of the 0 point. The projecting portion 191 of this member engages the next adjacent lever 180 in a lower order position and holds it against rotation. The other levers 180 in lower order positions are also held if their members 190 are in intermediate positions, and their print wheels may be stopped in any position determined by the holes punched.

It may sometimes be desirable to eliminate the printing of zeros to the right of some predetermined printing position. This may be done by moving the member 190 on the lever corresponding to the wheel in the lowest order printing position to its outer extreme position in Fig. 2. This removes the projecting portion 191 from the path of the next adjacent lever 180 so that the latter is free to move in a clockwise direction for locking the control lever 91 against movement when a perforation at the 0 point is sensed.

*Control circuits*

Figure 6:
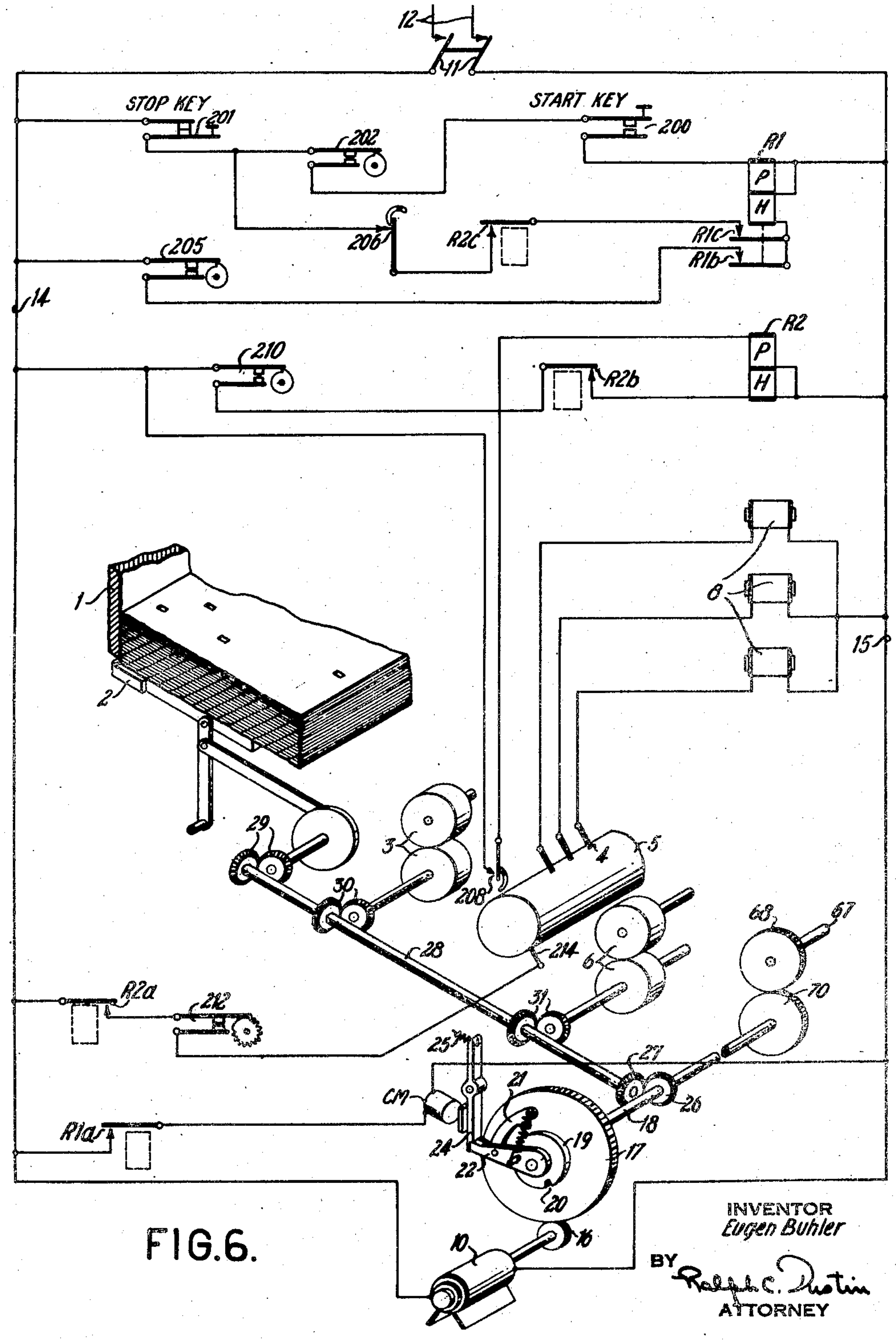
Fig. 6 is a schematic diagram of the card feeding mechanism and the wiring diagram for the printing mechanism shown in Figs. 1 to 5.
Figure 7:
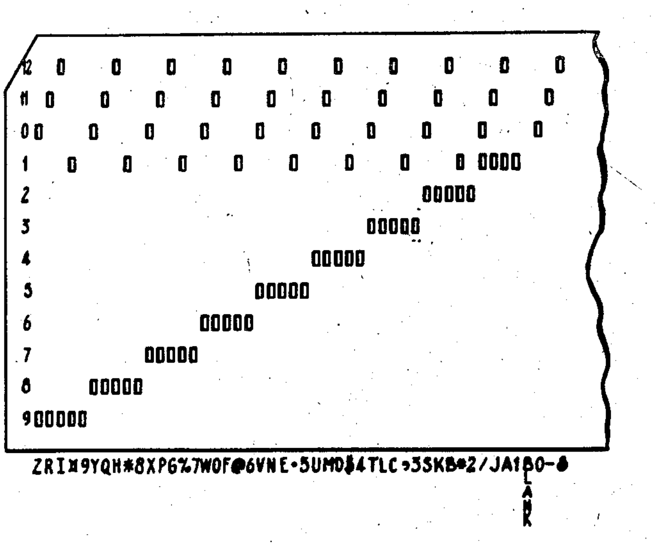
Fig. 7 is a view of a card with perforations employed for the different characters to be printed.

The operation of the printing mechanism described is under the control of electrical circuits shown in Fig. 6. In order to energize the clutch magnet CM and effect an operation of the card feeding means as well as the printing mechanism, there is provided a start key 200 in a circuit extending from the conductor 14 through a stop key 201, cam contacts 202, the start key, and the pickup winding of a relay R1 to the conductor 15. The cam contacts 202 close, as shown in Fig. 8, at 288° and effect an energizing of the relay R1 if the start key has been closed. Relay contacts R1*a* are connected in a circuit extending from the conductor 14 through the clutch magnet CM to the conductor 15, and these contacts close when the relay picks up to effect an energizing of the clutch magnet for releasing the dog 21.

A holding circuit for the relay R1 extends from the conductor 14 through cam contacts 205, relay contacts R1*b*, and the holding coil of relay R1 to the conductor 15. The cam contacts 205 close at 0° in a cycle and complete the holding circuit through the relay contacts R1*b*, and the holding coil of the relay. Another holding circuit for the relay R1 includes the stop key, a stacker control switch 206, relay contacts R2*c*, relay contacts R1*c*, and the holding coil of the relay. The contacts R2*c* are normally open so that this holding circuit is not established until a relay R2 is energized under the control of a card lever contact 208. This card lever contact is connected in a circuit extending from the conductor 14 through the pickup winding of relay R2 to the conductor 15, and is located so that it is closed by the advancing edge of the card at 288° in one cycle of machine operation and is opened when the trailing edge of the card passes it at 162° in the next cycle. A holding circuit for the relay R2 includes cam contacts 210, relay contacts R2*b*, and the holding coil of the relay R2. The contacts 210 close at 126° and open at 306° so that the relay R2 is held during the time that the card lever contacts 208 are open.

For energizing the magnets 8 through the brushes 4, there are provided relay contacts R2*a* and cam contacts 212 connected in a circuit between the conductor 14 and a brush 214 engaging the contact roll 5. The cam contacts 212 close only when the card index points 9 to 0, 11, and 12 come under the brushes 4. If a perforation is sensed at any one of these points after the relay contacts R2*a* close, a circuit is completed through one of the magnets 8 to effect an operation of its control lever 91.

When the last card passes the contacts 208, the relay R2 is held up through the cam contacts 210 until 306° in the cycle. The holding circuit is broken at this time and the relay is deenergized to effect an opening of its contacts R2*a*, R2*b*, and R2*c*. The opening of contacts R2*c* breaks one of the holding circuits for the relay R1, and the cam contacts 205 open at approximately the same time to break the other holding circuit for relay R1. This relay is then deenergized and its contacts R1*a* open to deenergize the clutch magnet and effect a latching of the dog 21. The operation of the card feeding mechanism and the printing mechanism is then stopped until more cards are placed in the feed hopper and the start key is again closed.

*Printing mechanism of Figs. 9 to 14*

There is shown in Figs. 9 to 14 another form of the improved printing machine which is operable in response to the sensing of perforations in cards. In this case, the printing mechanism is operable to print the characters shown in Fig. 12 when the cards are fed with their 12 points first to a card sensing means. Parts of the printing mechanism are the same as those used in the first form of the invention and will be designated by the same reference numerals.

Figure 9:
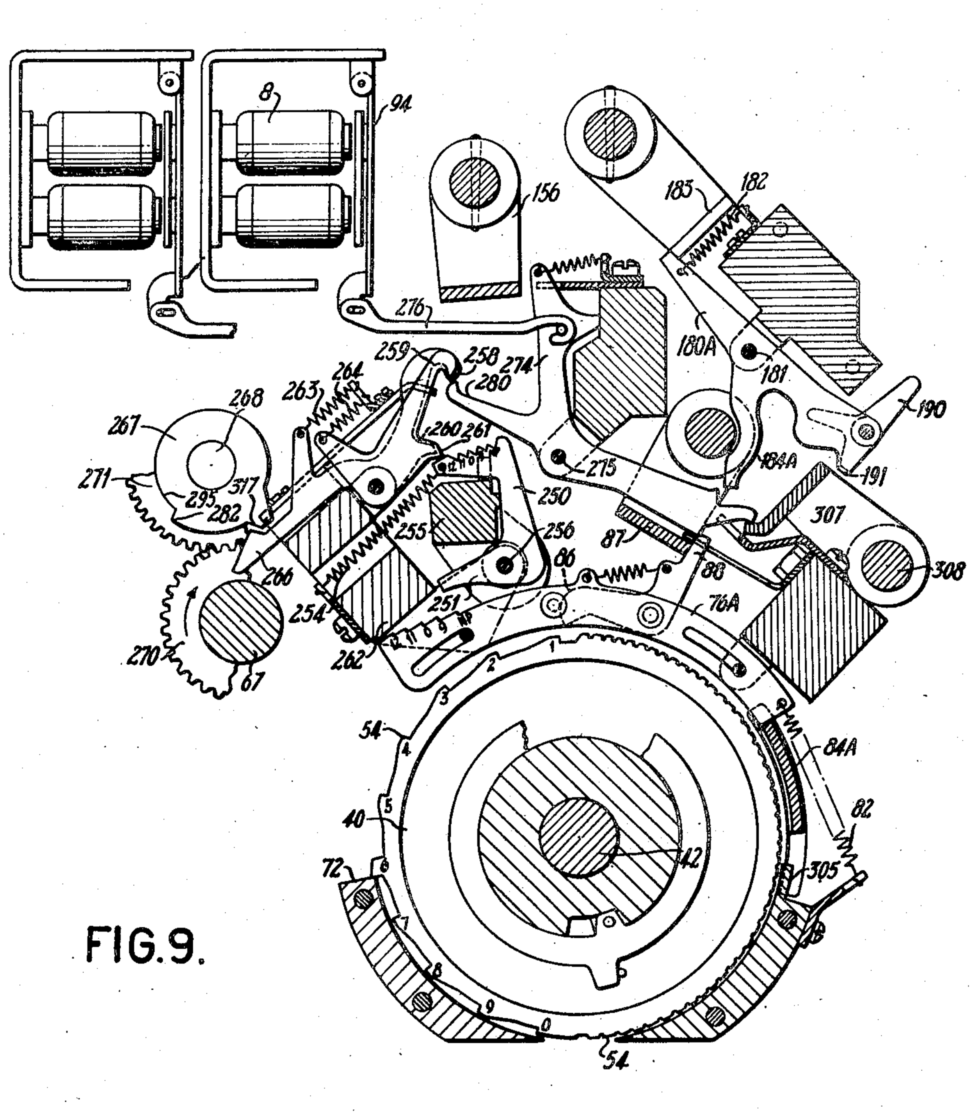
Fig. 9 is a view similar to Fig. 2 but showing another form of printing mechanism.

Print wheels 40 are supported in the same manner to be driven frictionally by the shaft 42. The ratchet teeth 54 are numbered from 1 to 9 and 0 as shown in Fig. 9 and are adapted to be engaged by the stop pawl 86 for determining the position of the printing wheel. As the print wheel rotates in a clockwise direction, the type elements 54 move successively to positions above the type hammer 56 for effecting a printing of the characters in the order reading from left to right in Fig. 12. The stop pawl 86 is pivotally supported by an arcuate slide 76A which is like the slide 76 of the first form of the invention except that it has adjacent its left-hand end steps marked NP, 9, 0, 11, and 12, as shown in Fig. 9.

Figure 14:
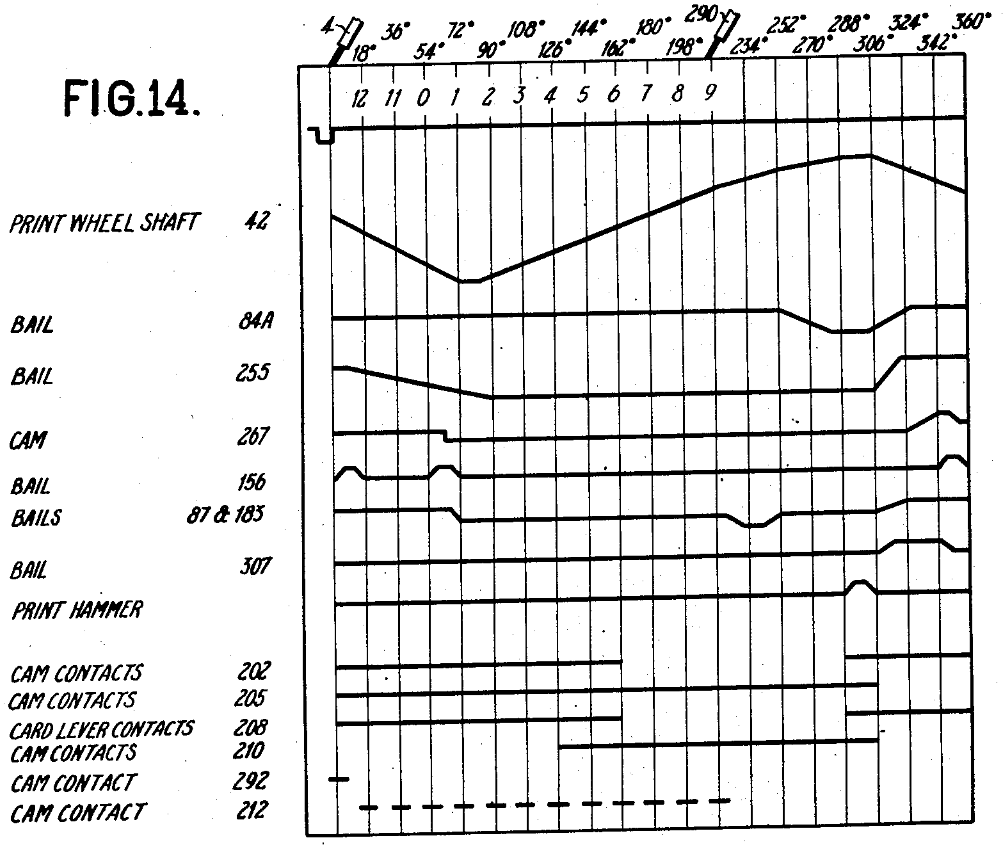
Fig. 14 is a timing diagram.
Figure 12:
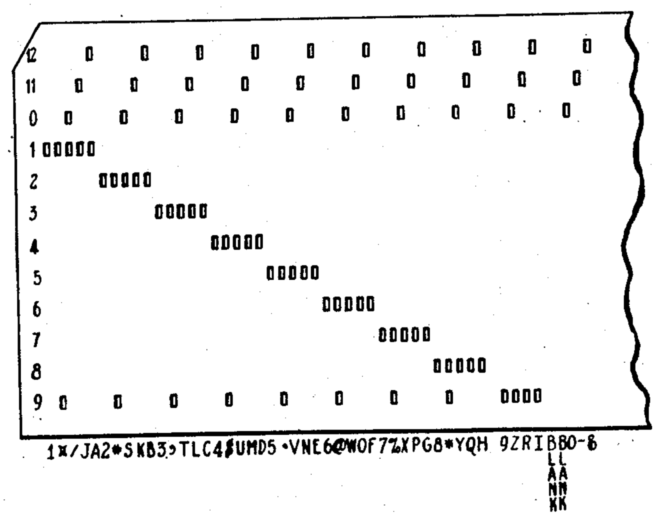
Fig. 12 is a view of a card perforated to effect a printing of different characters by the mechanism of Fig. 9.

A bail 84A holds the slides 76A in their home positions at the beginning of each printing cycle and is operable to permit movement of the slides to the right by springs 82 later in the cycle. The bail 84A is operated in the same way as the bail 84 described above in the first form of the invention, but its operation takes place during a different part of the cycle, as indicated by Fig. 14.

Pivotally mounted in the plane of the slide 76A is a zoning pawl 250 having notches 12, 11, 0, 9, and NP formed in its upper end, and a finger portion 251 at its lower end adapted to move into positions for engagement with any or one of the steps NP, 9, 0, 11, or 12 on the slide 76A. A spring 254 holds the zoning pawl 250 in yielding engagement with a bail 255 which is fixed to a transverse shaft 256. Pivotally mounted in the plane of the zoning pawl are two pawls 258 and 259 having finger portions 260, 261, respectively, which are adapted to engage the notches 12, 11, 0, 9, or NP in the zoning pawl. The pawls 258 and 259 are pivotally supported on comb-like extensions of a transversely extending member 262, and springs 263 and 264 continuously urge the pawls in a direction to engage them with the zoning pawl notches. Formed on the pawl 258 is a rearwardly extending portion 266 adapted to cooperate with a cam 267 fixed to a shaft 268. The shaft 268 is driven in a counterclockwise direction in Fig. 9 by a gear 270 fixed to the shaft 67 and meshing with a gear 271 on the shaft 268.

A control lever 274, similar to the control lever 91 in the first form of the invention, is pivotally supported at 275 and is operatively connected by a link 276 to the armature 94 of one of the magnets 8. A hooked arm 280 on the control lever is engaged by the upper end of the pawl 258, as shown in Fig. 9, when the parts are in their home positions. As long as the pawl 258 engages the arm 280, its nose 260 is held in a position free of the stop pawl 250 and its rearwardly extending portion 266 is out of engagement with an intermediate dwell 282 on the cam 267. The nose 261 of the pawl 259 engages the zoning pawl 250, as shown in Fig. 9, and its upper end is held in a position spaced a short distance from the end of the arm 280.

The upwardly projecting tail portion 88 on the stop pawl 86 is engageable with the control lever 274 when the bail 87 is rocked in a clockwise direction and is held by such engagement free from the ratchet teeth 54 until the control lever is rocked by an energizing of the magnet 8.

Figure 13:
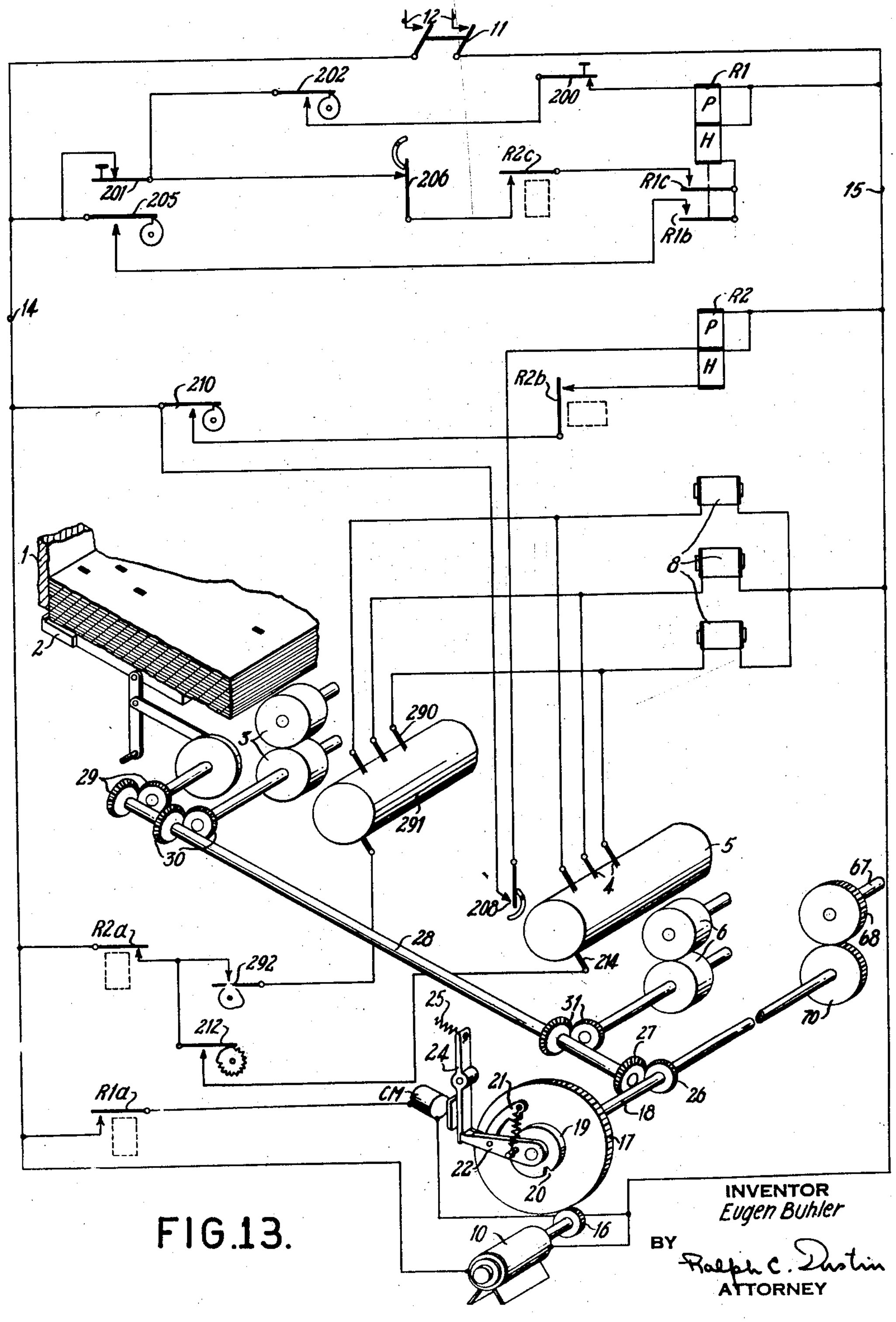
Fig. 13 shows the card feeding mechanism and the wiring diagram for the printer of Fig. 9.

In this form of the invention, the perforated cards are fed with their No. 12 points first past two sets of sensing brushes 4 and 290 (Figs. 13 and 14). The brushes 4 make contact with the contact roll 5 upon the sensing of perforations and effect an energizing of the magnets 8 in the same manner described for the first form of the invention. The brushes 290 are spaced in advance of the brushes 4 so as to engage the No. 9 points on the cards one cycle point before the No. 12 points reach the brushes 4. The brushes 290 are connected to the magnets 8 and are adapted to engage a contact roll 291 upon sensing of perforations. The contact roll 291 is connected to a cam contact 292 which is moved to its closed position only when the No. 9 points on the cards pass under the brushes 290.

The cards are advanced as in the first form of the invention from a hopper 1 by a picker 2 to a pair of feed rolls 3 which advances them under the brushes 290 and 4 to the feed rolls 6. The picker and the feed rolls are driven from the shaft 28 which is driven by the shaft 18 upon the engagement of the dog 21 with the notch 20 in the clutch plate 19. The motor 10 operates continuously to drive the feed clutch through the gears 16 and 17, and a releasing of the dog by the clutch magnet CM effects a feeding of cards as well as a driving of the cam shaft 67 in the printing mechanism.

Assume that the clutch magnet is energized and that the dog 21 has engaged the notch 20 for effecting a feeding of cards and a driving of the printing mechanism. At the end of the first machine cycle a card will have advanced to a position so that its index points are located with respect to the brushes as indicated in Fig. 14. It will be noted in this figure that the brush 290 is sensing the No. 9 index point on the card, and the brush 4 is in a position to sense the No. 12 index point after the card is advanced one cycle point. The print wheels 40 are oscillated by mechanisms similar to that used in the first form of the invention, but the driving cams are shaped so that the print wheels are not oscillated in a clockwise direction from their home positions until the No. 1 index points on the cards pass under the brushes 4. If a perforation is sensed by the brush 290 at the No. 9 point, the control lever 274 is rocked so that its arm 280 moves downwardly to permit the pawl 258 to swing in a clockwise direction until its rearwardly extending portion 266 engages the intermediate dwell 282 on the cam 267. The nose 260 on the pawl is then held slightly above the teeth at the notches 12, 11, 0, and 9 on the zoning pawl 250.

The bail 255 is permitted to swing in a counterclockwise direction so that the zoning pawl 250 may follow and moves its notches 12, 11, and 0 under the nose 261 of the pawl 259 in synchronism with the moving of corresponding index points on the card past the brush 4. Just before the 12 point on the card passes under the brush 4, the knockoff bail 156 operates to move the control lever 274 to its latching position. As the zoning pawl 250 moves from the position shown in Fig. 9, the nose 261 rides off a high portion at the left on the notch 12 and permits the upper end of the pawl 259 to engage the arm 280. This movement is insufficient to drop the nose 261 to a position low enough for engagement with any one of the notches. If a perforation is sensed at any one of the 12, 11, or 0 points on the card, the control lever 274 is rocked to a position which permits the pawl 259 to move over the end of the arm 280 until its nose 261 engages the corresponding numbered notch. If no perforation is sensed at one of these points, the zoning pawl 250 continues swinging in a counterclockwise direction until it is stopped either by the nose 260 engaging the No. 9 notch or by an upwardly projecting portion at the NP notch engaging the nose 261. The arm 251 on the zoning pawl moves downwardly into a position for engagement by the step on the slide 76 corresponding to the notch engaged by one of the pawls.

As mentioned above, a sensing of a perforation at a No. 9 index point by one of the brushes 290 results in a swinging of the pawl 258 until its tail portion 266 engages the intermediate dwell 282 on the cam 267. If the zoning pawl 250 is not stopped during its counterclockwise swinging movement by the pawl 259, then the No. 9 notch will come under the nose 260 of pawl 258 just as the tail portion 266 drops from the intermediate dwell 282 to a low dwell 395 on the cam 267. The nose 260 then engages the No. 9 notch and holds the zoning pawl 250 against further movement to the left.

If no perforation is sensed at either the 12, 11, 0, or 9 points, then both of the pawls 258, 259 are held free of the corresponding notches by the arm 280 on the control lever 274, and the outwardly projecting portion at the NP (No Print) notch engages the ends of the pawls for stopping the pawl 250.

It will be noted that the No. 1 point on a card is the first to come under the brush 4 after the zero point is sensed. If a perforation is sensed at the No. 1 point, the control lever 274 is rocked to release both of the pawls 258, 259, and the noses 260, 261 are dropped. The zoning pawl 250 is permitted to move to the left so that the NP notch comes into position for receiving the noses of the pawls when a perforation is sensed at the No. 1 point.

Figures 10, 11:
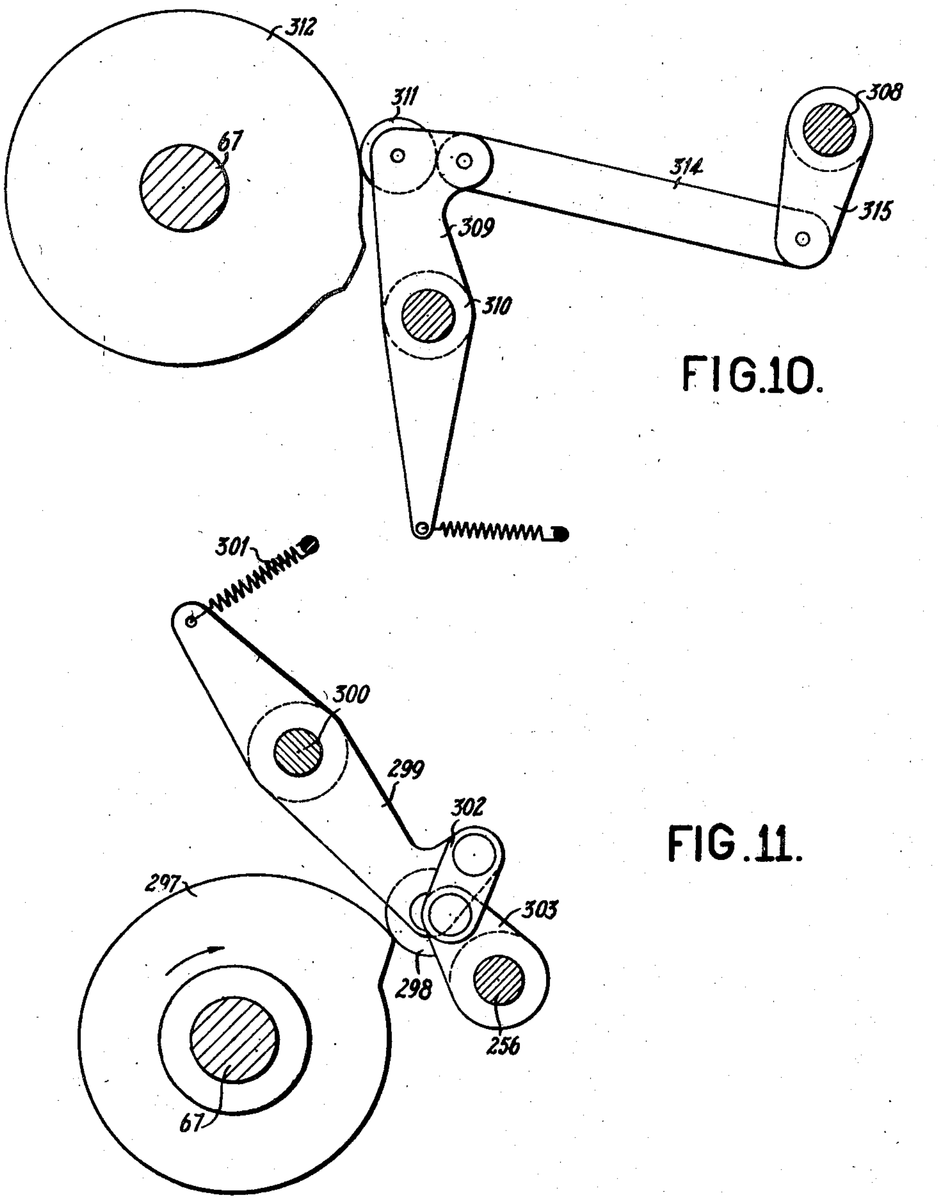
Figs. 10 and 11 are views of operating mechanisms for bails shown in Fig. 9.

For swinging the bail 255 to determine the movement of the zoning pawl 250 there is provided, as shown in Fig. 11, a cam 297 attached to the shaft 67 and engaged by a roller 298 carried by a follower 299 pivotally supported at 300. A spring 301 holds the follower in engagement with the cam 297, and a link 302 connects the lower end of the follower to an arm 303 on the shaft 256 to which the bail 255 is fixed. The cam 297 is shaped to permit movement of the bail 255 in a counterclockwise direction from the beginning of each cycle, as shown in Fig. 14, until after the No. 1 point is sensed. It is then held stationary until printing takes place when it is moved again to its extreme right-hand position.

Just before the No. 1 points of the card come under the brushes 4, the bail 87 is moved to the left so that the stop pawls 86 are held only by the control levers 274 out of engagement with the ratchet teeth 54. A sensing of a perforation at any one of the index points 1 to 9 results in an operation of the control lever to release the stop pawl for engaging the corresponding numbered tooth. One cycle point after the No. 9 points on the cards pass under the brushes 4 an impulse is delivered to each of the magnets 8 for effecting a release of the corresponding stop pawl 86, if it is not already released, to engage the 0 tooth 54 on the print wheel. When the stop pawl engages the 0 tooth and the zoning pawl 250 engages the NP step on the slide 76A (this condition existing when no holes have been sensed in the card and the stop pawl has not been prevented from operating by a zero control mechanism to be described later) the print wheel is stopped in a position with an open space on its periphery above the type hammer so that no printing takes place. The pulsing of the magnets 8 to release the stop pawl for engaging the 0 tooth is accomplished by closing the cam contact 212 to complete a circuit to the magnets through the brush 214, the contact roll 5 and the brushes 4 just as the trailing edge of the card passes under the latter.

When there is a perforation in the card only at the 0 point, then the zoning pawl 250 is positioned to engage the 0 step on the slide 76A and the stop pawl 86 is released by the cam pulse to engage the 0 tooth on the print wheel. This results in a positioning of the wheel to print a zero. A hole at the 11 or 12 point alone results in a positioning of the zoning pawl 250 to engage the 11 or 12 step on the slide and a release of the stop pawl to engage the 0 tooth on the wheel for stopping the latter in positions to print either a dash line (–) or the sign (&). If the stop pawl is held retracted by the zero print control mechanism, then a releasing of the pawl from the control lever 274 does not take place until the slide 76A is permitted to move to the right by a swinging of the bail 84A in a clockwise direction. A releasing of the stop pawl at this time results in its engagement with the smooth portion of the print wheel adjacent the 0 tooth, and the print wheel continues rotating in a clockwise direction until its tooth extending outwardly beyond the others engages an abutment 305. The print wheel is then in a no print position.

The zero print control is similar to that described for the first form of the invention. In this case a lever 180A is pivotally supported at 181 and is provided with an arm 184A which is adapted to move directly over a tail portion of the control lever 274 for holding the latter against movement when its magnet 8 is energized. The spring 182 holds the lever 180A against the bail 183 unless the control lever 274 is in a position to prevent movement of the lever 180A in a clockwise direction. When the control lever is rocked to release the stop pawl, the tail portion 88 of the pawl moves under the control lever and holds the latter in its raised position. Just after the No. 9 points of the card are sensed, the bail 183 is rocked in a counterclockwise direction to permit movement of the levers 180A to positions over the control lever. Pivoted in each lever 180A is a control member 190 having a projecting portion 191 engageable with the adjacent lever 180A in the lower order position. The control member is movable to three positions, as in the first form of the invention. In one of its positions it engages a bail 307 for holding the lever 180A against movement in a clockwise direction. The functions of the control member are the same as those described in detail for the first form of the invention.

The bail 307 is fixed to a shaft 308 which is adapted to be rocked by a mechanism shown in Fig. 10. This mechanism comprises a follower 309 pivotally supported at 310 and carrying a roller 311 engaging a cam 312 fixed to the shaft 67. A link 314 connects the follower to an arm 315 on the shaft 308 for effecting an operation of the bail 307. The lower edge of the bail 307 is hooked, as shown in Fig. 9, and underlies the tail portions of the control levers 274. Just after printing takes place, the bail 307 is rocked in a clockwise direction so that its hooked portion engages the control levers and rocks them in a direction to permit movement of the pawls 258, 259 over the hooked ends of the arms 250 to the positions shown in Fig. 9. The pawls 258 are moved to their retracted positions by a high portion 317 on the cam 267 acting against the tail portions 266 of the pawls, and the pawls 259 are returned to the positions of Fig. 9 by the action of the zoning pawls 250 against the portions 261.

*Control circuits for printer of Fig. 9*

The circuits for the printer of Fig. 9 are like those described above for the first form of the invention except that a circuit is provided from the relay contacts R2*a* through the cam contact 292 to the contact roll 291, and the brushes 290 are adapted to complete circuits from the contact roll to the magnets 8.

When the start key is operated and the cam contacts 202 are closed at 288°, the relay R1 is energized so that its contacts R1*a* complete the circuit through the clutch magnet CM for effecting a driving of the card feeding mechanism at the beginning of the next cycle. Contacts R1*b* close at the same time to provide a holding circuit for the relay when the cam contacts 205 close at the beginning of the cycle. The start key may be released as soon as the holding circuit is established because this circuit maintains operation until after a card is advanced to a point for closing the contacts 208 and energizing the relay R2 to close its contacts R2*c* in the second holding circuit for the relay R1. At the end of the first card feed cycle, the brushes 290 engage the No. 9 points of the card and the cam contact 292 is closed to complete circuits through any brushes 290 that may be sensing perforations. The relay contacts R2*a* were closed upon the closing of the contacts 208 by the leading edge of the card.

As the card is advanced in the next machine cycle, the 12, 11, 0, and 1 to 9 points on the card come under the brushes 4 for sensing. The cam contact 292 is open during this time to prevent an energizing of the magnets 8 through the brushes 290. While each of the card points is passing under the brushes 4, the cam contacts 212 are closed to effect an energizing of the magnets 8 if perforations are sensed. If a second card is fed from the hopper as the first card is advanced, the leading edge of the second card closes the contacts 208 to maintain the circuits for continuing operation of the printer. During the time when the contacts 208 are open, the relay R2 is held up by the holding circuit through the cam contacts 210 and the relay contacts R2*b*. The last card from the hopper holds the contacts 208 closed until a cycle is started to advance the card under the brushes 4 and eject it from the machine. Since there is no card fed from the hopper during the same cycle to close the contacts 208 again before the end of the cycle, the relay R2 will be deenergized and effect an opening of the holding circuits for relay R1.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A printing machine controlled by record cards having combinational designations arranged thereon in zone and subzone groups comprising, in combination, means for sensing the subzone and zone designations in succession, a magnet controlled by said sensing means, a printing wheel, means for moving said wheel, a stop for the wheel controlled by said magnet to effect a differential setting of said wheel in accordance with the sensed subzone designations, means for moving said wheel and said stop together after said subzone designations have been sensed, a second stop positioned under control of said magnet for arresting movement of said wheel and said first stop upon the sensing of a zone designation, a third stop adapted to be released by said magnet upon the sensing of a predetermined subzone designation, and means operable after said zone designations have been sensed for effecting movement of said third stop when released to a position in which it arrests movement of said wheel and said first stop if such movement has not already been arrested by said second stop.

2. A printing machine operable in response to the sensing of designations at index points on a card comprising, in combination, means coacting successively with said points for sensing designations, a printing member having ratchet teeth thereon, means for moving said member to different printing positions in synchronism with the coaction of said sensing means with said index points, a stop pawl engageable with said ratchet teeth for arresting movement of said member, a movable slide pivotally supporting said stop pawl, means including a magnet operable upon the sensing of any designation for effecting an actuation of said stop pawl to engage one of said ratchet teeth, means for effecting movement of said slide after coaction of said sensing means with said index points, a zoning pawl engageable with said slide for limiting movement of the latter, means controlled by said magnet for holding said zoning pawl in its retracted position, said last mentioned means operable upon the sensing of a designation at a predetermined index point for releasing said zoning pawl, and cam controlled means operable upon the release of said zoning pawl for engaging it with said slide after predetermined movement of the latter.

3. A printing machine operable in response to the sensing of perforations at index points numbered 9 to 1, 0, 11, and 12 on a card comprising, in combination, means coacting successively with said points for sensing perforations, a printing member having ratchet teeth thereon, means for moving said member to different printing positions in synchronism with the coaction of said sensing means with said 9 to 1 and 0 points, a stop pawl engageable with said ratchet teeth for arresting movement of said member, a movable slide pivotally supporting said stop pawl, means including a magnet operable upon the sensing of a perforation for effecting an actuation of said stop pawl to engage one of said ratchet teeth, means for initiating movement of said slide upon the coaction of said sensing means with said 0 index point and continuing such movement, unless arrested, until after the 12 index point is sensed, a first zoning pawl engageable with said slide for arresting its movement, means controlled by said magnet and operable upon the sensing of a perforation at a 0, 11, or 12 index point for effecting engagement of said first zoning pawl with said slide, a second zoning pawl engageable with said slide for arresting its movement, means for holding said second zoning pawl normally in a retracted position, means for releasing said second zoning pawl from said holding means upon the sensing of a perforation at the No. 1 index point, and cam controlled means operable to engage said second zoning pawl when released with said slide after said sensing means has coacted with said No. 12 point.

4. A printing machine operable in response to the sensing of perforations at index points numbered 12, 11, 0 and 1 to 9 comprising, in combination, a pair of sensing stations, means for feeding said card with its 12 points first through said sensing stations, a printing member, means for moving said printing member to different printing positions in synchronism with the movement of the index points 1 to 9 through one of said stations, the other of said stations being arranged to sense perforations at the number 9 points before the 12 points reach said one of said stations, a stop pawl for arresting movement of said member, a movable slide pivotally supporting said stop pawl, means operable upon the sensing of a perforation at any one of said points 1 to 9 by said one of said stations for actuating said stop pawl to stop said printing member, a zoning pawl movable to positions for limiting movement of said slide at points corresponding to said 12, 11, 0 and 9 index points, means for effecting movement of said zoning pawl to any one of its positions for limiting movement of said slide at the 12, 11 and 0 points, in response to the sensing of a perforation at a corresponding index point by said one of said stations, means for effecting movement of said zoning pawl to a position for limiting movement of said slide at the number 9 point in response to the sensing of a perforation at the corresponding index point by said other of said stations, said last mentioned means operating to effect movement of said zoning pawl only when no perforation is sensed at the 12, 11 and 0 points, and means for initiating movement of said slide after the 9 index point has passed said one of said stations and continuing such movement until arrested by said zoning pawl.

5. A printing machine operable in response to the sensing of perforations at index points numbered 12, 11, 0 and 1 to 9 on a card comprising, in combination, means coacting successively with said points starting with the number 12 point for sensing perforations, separate means adapted to sense a perforation at the number 9 point just before said first mentioned means coacts with the number 12 point, a printing member, means for moving said printing member to different printing positions in synchronism with the coaction of said first mentioned means with said points 1 to 9, a stop operable upon the sensing of a perforation at said points 1 to 9 for arresting said printing member, means for moving said stop and said printing member together after said first mentioned means coacts with the number 9 point, a member movable to different positions for limiting movement of said stop, and means for positioning said member in response to the sensing of a perforation at one of the points 12, 11 or 0 by said first mentioned means or to the sensing of a perforation at the number 9 point by said separate means.

6. The machine of claim 5 in which said movable member comprises a zoning pawl, having notches therein, and said means for positioning said member comprises a pair of stop pawls engageable with said notches, means for actuating said zoning pawl so that certain ones of its notches move past said stop pawls in synchronism with the coaction of said first mentioned sensing means with the 12, 11 and 0 points, means operable upon the sensing of a perforation at any one of said 12, 11 and 0 points for actuating one of said stop pawls to engage one of said notches, and means operable upon the sensing of a perforation at the number 9 point by said separate sensing means for actuating the other one of said stop pawls to engage another notch in said zoning pawl.

References Cited in the file of this patent

UNITED STATES PATENTS

| | | |
|---|---|---|
| 2,133,865 | La Boiteaux | Oct. 18, 1938 |
| 2,157,035 | Torkelson | May 2, 1939 |
| 2,199,561 | Fuller | May 7, 1940 |
| 2,227,143 | Knutsen | Dec. 31, 1940 |
| 2,424,076 | Buhler | July 16, 1947 |
| 2,438,071 | Page | Mar. 16, 1948 |